US006559763B2

United States Patent
Murphy et al.

(10) Patent No.: US 6,559,763 B2
(45) Date of Patent: May 6, 2003

(54) FRONTAL IMPACT CHARACTERIZATION APPARATUS FOR A MOTOR VEHICLE RESTRAINT SYSTEM

(75) Inventors: Morgan D. Murphy, Kokomo, IN (US); Douglas Allen Nunan, Kokomo, IN (US); Charles A. Cluff, Zionsville, IN (US); David R. Little, Kokomo, IN (US); Greston T. McCoy, Jr., Alexandria, IN (US); Gary Eugene Oberlin, Windfall, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/840,553

(22) Filed: Apr. 23, 2001

(65) Prior Publication Data

US 2002/0154006 A1 Oct. 24, 2002

(51) Int. Cl.[7] .................................................. B60Q 1/00
(52) U.S. Cl. ........................ 340/436; 340/438; 340/665; 701/300
(58) Field of Search ................................ 340/436, 438, 340/665; 280/735; 73/721; 701/70, 300, 301

(56) References Cited

U.S. PATENT DOCUMENTS

| 3,889,232 A | * | 6/1975 | Bell ............................... 340/52 |
| 4,346,914 A | * | 8/1982 | Livers et al. .................. 280/735 |
| 5,416,360 A | * | 5/1995 | Huber et al. .................. 307/10.1 |
| 5,447,051 A | * | 9/1995 | Hanks et al. .................... 73/1 D |
| 5,604,314 A | * | 2/1997 | Grahn ............................ 73/628 |
| 5,936,549 A | * | 8/1999 | Tsuchiya ...................... 340/903 |
| 5,987,370 A | * | 11/1999 | Murphy et al. ................. 701/45 |
| 6,020,812 A | * | 2/2000 | Thompson et al. ........... 340/438 |
| 6,070,113 A | * | 5/2000 | White et al. .................... 701/45 |
| 6,204,756 B1 | * | 3/2001 | Senyk et al. .................. 340/438 |
| 6,249,730 B1 | * | 6/2001 | Khairallah et al. ............ 701/45 |
| 6,329,910 B1 | * | 12/2001 | Farrington .................... 340/436 |

OTHER PUBLICATIONS

Research Disclosure Publication #42208, Jun. 1999 #422, Page 752.

* cited by examiner

Primary Examiner—Daniel J. Wu
Assistant Examiner—Phung Nguyen
(74) Attorney, Agent, or Firm—Robert M. Sigler

(57) ABSTRACT

An improved vehicle crash sensing apparatus quickly and reliably characterizes frontal impacts with only minimal data processing requirements. Two or more longitudinally separated piezoelectric strips strategically located in a frontal portion of the vehicle produce impact signals that are analyzed to characterize the type of impact and the structural crush rate. In a simple implementation involving only two piezoelectric strips, a first strip extends laterally along a forward portion of the front bumper, and a second strip extends laterally along a forward portion of the hood panel, above and rearward of the first strip. In cases where an impact signal is developed by only one of the two strips, a high (under-ride) or low (over-ride) impact is indicated. If impact signals are developed by both strips, the intervening time is measured as an indication of the structural crush rate. In a more complex implementation, the bumper and hood strips are divided into two or more individual strip segments so the center and distribution of impact and the impact vector may be quickly and reliably characterized as well.

12 Claims, 2 Drawing Sheets

FRONTAL IMPACT CHARACTERIZATION APPARATUS FOR A MOTOR VEHICLE RESTRAINT SYSTEM

TECHNICAL FIELD

The present invention is directed to motor vehicle restraint systems, and more particularly to apparatus for detecting and characterizing a frontal impact of the vehicle.

BACKGROUND OF THE INVENTION

Motor vehicle restraint systems have become increasingly complex, and often include a number of different restraint devices (such as seat belt pre-tensioners, frontal air bags, knee bolsters, and so on) designed to protect the occupants under a variety of circumstances. For this reason, it is important to be able to reliably characterize a detected impact or crash event in order to select the most appropriate restraints, and to deploy the selected restraints at the optimal time. A common approach in this regard is to install crash sensors at distributed locations of the vehicle, and to process all of the crash sensor data for purposes of characterizing a detected crash event. Also, various types of crash sensors can be used, such as mechanical inertia and intrusion switches, electronic accelerometers, piezoelectric strips, and so on. From a practical standpoint, however, only a limited number of crash sensors are typically used, so that the system cost and data processing requirements might be minimized. Thus, what is needed is a cost-effective way of detecting and characterizing frontal vehicle impacts.

SUMMARY OF THE INVENTION

The present invention is directed to an improved and cost-effective sensing apparatus for quickly and reliably characterizing frontal impacts with only minimal data processing requirements. According to this invention, two or more longitudinally displaced piezoelectric strips strategically located in a frontal portion of the vehicle produce impact signals that are analyzed to characterize the type of impact and the structural crush rate. In a simple implementation involving only two piezoelectric strips, a first strip extends laterally along a forward portion of the front bumper, and a second strip extends laterally along a forward portion of the hood panel, above and rearward of the first strip. In cases where an impact signal is developed by only one of the two strips, a high (under-ride) or low (over-ride) impact is indicated. If significant impact signals are developed by both strips, the intervening time is measured as an indication of the structural crush rate. In a more complex implementation, the bumper and hood strips are divided into two or more individual strip segments so the center and distribution of impact and the impact vector may be quickly and reliably characterized as well.

DESCRIPTION OF THE PREFERRED EMBODIMENT

Figure 1:
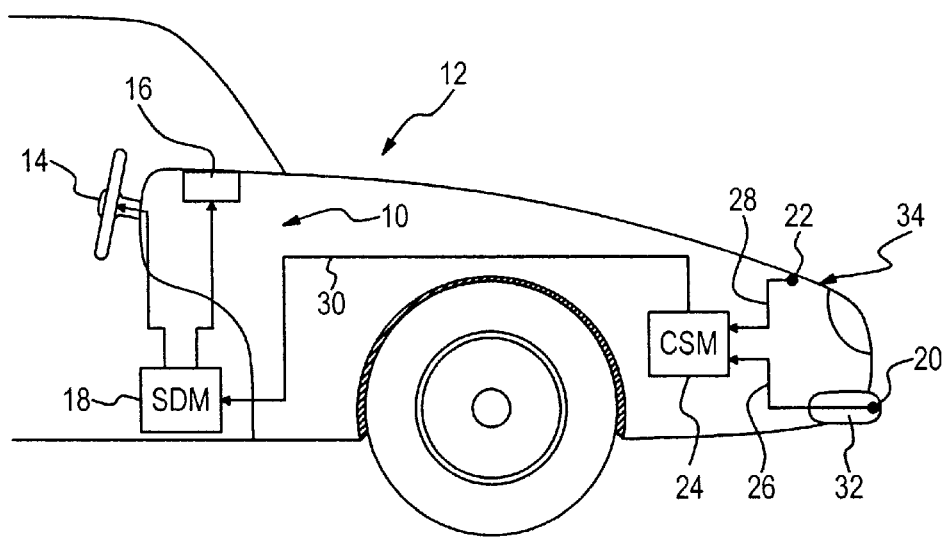
FIG. 1 is a side view of a vehicle equipped with a restraint system according to a first embodiment of this invention, including first and second piezoelectric strips affixed to the vehicle bumper and hood panel, respectively, and a microprocessor-based contact sensing module.
Figure 2:
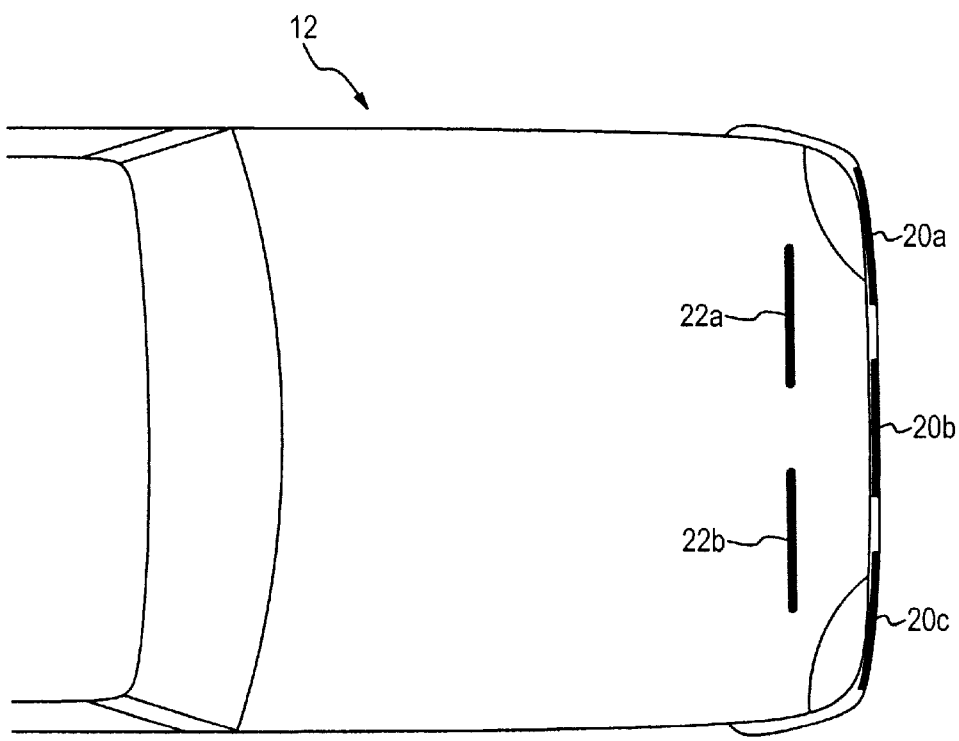
FIG. 2 is an overhead view of a vehicle equipped with a restraint system according to a second embodiment of this invention, including multiple piezoelectric strips affixed to the vehicle bumper and hood panel.

Referring to FIGS. 1–2, the impact characterization apparatus of this invention is illustrated in the context of a supplemental restraint system 10 for a motor vehicle 12. The vehicle 12 is equipped with a number of restraint devices, such as the usual driver and front passenger airbags 14, 16, and a microprocessor-based Sensing and Diagnostic Module (SDM) 18 that electrically deploys the airbags 14, 16 in the event of a severe crash to protect the vehicle occupants. The SDM 18 typically has one or more internal accelerometers that are used to measure the severity of the crash event, and many systems of this type also obtain information developed by auxiliary or remote sensing mechanisms, such as occupant position sensors and remote crash sensors. The present invention is directed to a remote crash sensing mechanism including two or more piezoelectric strips 20, 22 and a microprocessor-based Crash Sensing Module (CSM) 24. When subjected to mechanical shock or deformation, the piezoelectric strips 20, 22 develop electrical signals on lines 26, 28 in relation to the intensity of the shock or deformation, and CSM 24 utilizes the signals, referred to herein as crash intensity signals, to characterize frontal crash events. The characterization includes information as to the type of collision (i.e., full frontal, over-ride or under-ride) and as to the initial rate of vehicle crush due to the collision. Such information is provided as an input to SDM 18 via line 30, and SDM 18 utilizes the information as part of its overall decision-making process in determining whether and/or how forcefully to deploy the restraints 14, 16.

As seen in FIGS. 1–2, the piezoelectric strip 20 extends laterally along a forward portion of the vehicle's front bumper 32, while the piezoelectric strip 22 extends laterally along a forward portion of the vehicle's hood panel 34. In this way, the strips 20 and 22 are separated both longitudinally and vertically. The vertical separation enables CSM 24 to characterize the type of collision (i.e., full frontal, over-ride or under-ride), while the longitudinal separation enables CSM 24 to determine an initial crush rate of the vehicle 12 in the case of a full frontal crash. In a preferred embodiment, the strips 20, 22 are each sub-divided into two or more individual strips 20a, 20b, 20c, 22a, 22b as shown in FIG. 2. This additionally enables CSM 24 to compute the center and distribution of the collision at both the bumper 32 and hood panel 34, which further characterizes the crash event in terms of the collision vector. In either embodiment, the piezoelectric strips 20 and 22 are affixed to the inboard surface the bumper 32 and hood panel 34 (as illustrated in FIG. 1), and are not visible from the exterior of the vehicle 12. Thus, the strip(s) 20 is affixed to a structural member of the bumper 32 behind a compliant fascia covering the bumper 32, and the strip(s) 22 is affixed to the inboard surface of hood panel 34.

Figure 3:
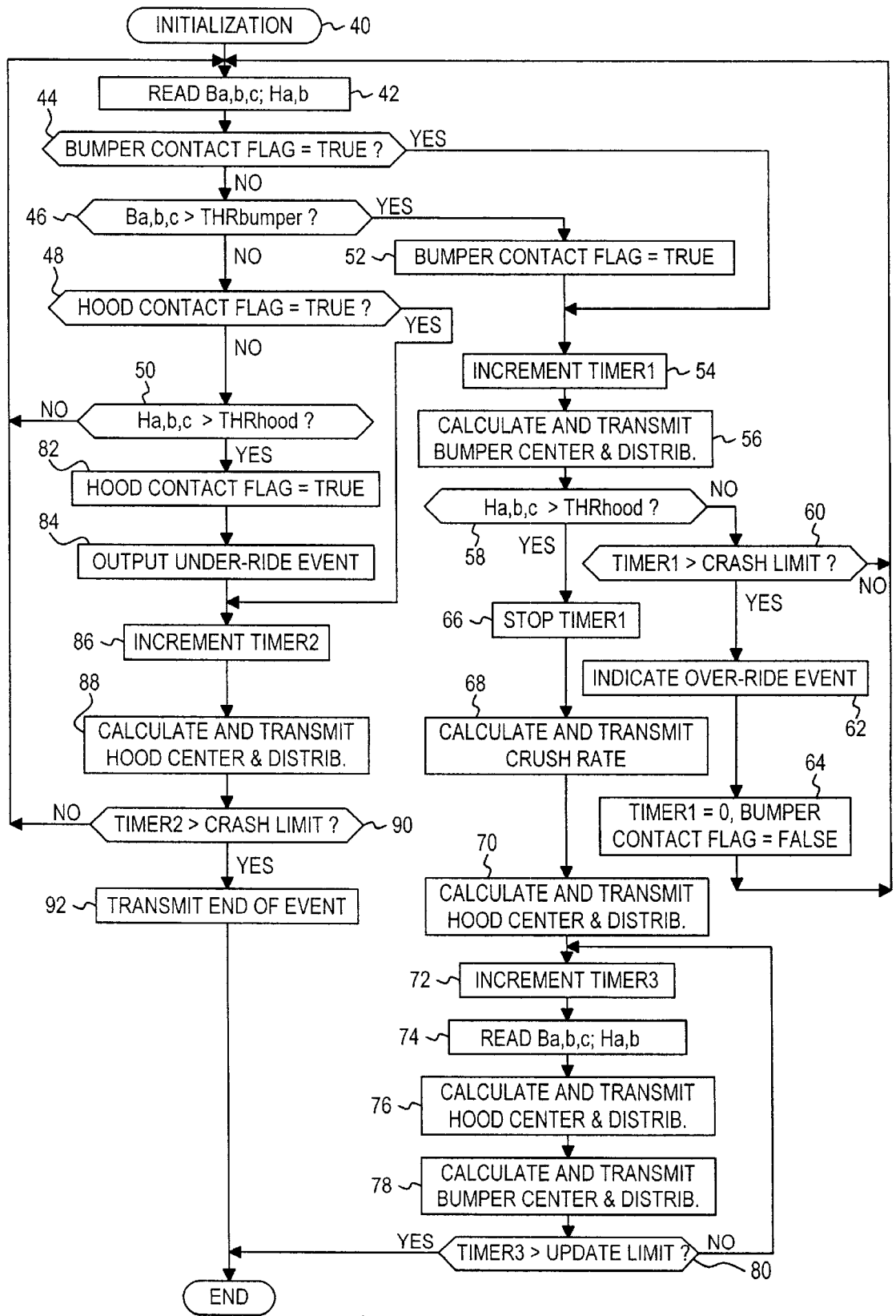
FIG. 3 is a flow diagram illustrating a signal processing routine carried out by the microprocessor-based contact sensing module of FIG. 1 for the multiple strip implementation of FIG. 2.

FIG. 3 is a flow diagram of a software routine executed by CSM 24 for characterizing a crash event based on crash intensity signals generated by the sub-divided piezoelectric strips 20a, 20b, 20c, 22a, 22b of FIG. 2 according to this invention. The block 40 designates a series of initialization instructions executed at the beginning of each period of vehicle operation for the purpose of resetting various timers, flags and variables to predetermined settings. For example, timers may be reset to zero and flags may be set to FALSE. Following initialization, the block 42 is executed to read the crash intensity signals Ba, Bb, Bc developed by bumper strips 20a, 20b, 20c, and the crash intensity signals Ha, Hb developed by hood strips 22a, 22b. Initially, the block 44 will be answered in the negative, and block 46 is executed to determine if one or more of the bumper signals Ba, Bb, Bc exceeds a threshold intensity, THRbumper. If not, the blocks 48 and 50 are executed to check the hood strips 22a, 22b. Block 48 will initially be answered in the negative, and the block 50 determines if one or more of the hood signals Ha, Hb exceeds a threshold intensity, THRhood. If not, the blocks 42–50 are re-executed as indicated.

When a crash event initially causes one or more of the bumper signals Ba, Bb, Bc to exceed THRbumper, the blocks 52, 54 and 56 are executed to set the Bumper Contact Flag to True, to increment a timer (TIMER1), to calculate the center of bumper contact and the bumper contact distribution, and to transmit the calculated values to SDM 18 via line 30. CSM 24 then checks the hood signals Ha, Hb; if Ha and Hb are less than THRhood, and TIMER1 is less than a predefined crash limit, blocks 58 and 60 will be answered in the negative, and the foregoing blocks are re-executed as indicated. If Ha and Hb remain less than THRhood, and TIMER1 exceeds the crash limit, the blocks 62 and 64 are executed to signal SDM 18 that an over-ride crash event (i.e., a crash event in which the vehicle 12 collides with a relatively short object, with insignificant hood panel deformation) is occurring, and re-initializes TIMER1 and the Bumber Contact Flag. However, if Ha or Hb exceeds THRhood before TIMER1 exceeds the crash limit, the blocks 66, 68 and 70 are executed to stop TIMER1, to calculate a structural crush rate based on TIMER1, to calculate the center of hood contact and the hood contact distribution, and to transmit the calculated values to SDM 18 via line 30. Additionally, the blocks 72, 74, 76, 78 and 80 are then executed for a predefined update interval to update the hood and bumper calculations and send the updated calculations to SDM 18. The update interval is measured by TIMER3, which is incremented at block 72 and compared to an Update Limit at block 80. When TIMER3 exceeds Update Limit, the routine is completed.

If a crash event causes one or more of the hood signals Ha, Hb to exceed THRhood while the Bumper Contact Flag is still False, the blocks 82, 84, 86 and 88 are executed to set the Hood Contact Flag to True, to signal SDM 18 that an under-ride crash event (i.e., a crash event in which the vehicle 12 collides with an elevated object, with insignificant bumper deformation) is occurring, to increment a timer (TIMER2), to calculate the center of hood contact and the hood contact distribution, and to transmit the calculated values to SDM 18 via line 30. If the bumper signals Ba, Bb or Bc subsequently exceed THRbumper, as determined at block 46, the blocks 52–80 are executed as explained above to characterize the crash in terms of crush rate, center of hood and bumper contact and contact distribution. If TIMER2 exceeds a crash limit before any significant bumper contact is detected, as determined at block 90, the block 92 transmits an End of Event signal to SDM 18, completing the routine.

The aforementioned calculations are relatively simple, and may be carried out as follows. First, the crush rate may be simply calculated according to the reciprocal of TIMER1, as the longitudinal distance between the bumper and hood panel strips 20, 22 is fixed and known. The center of contact (for the hood or bumper signals) calculated by weighting and summing the respective crash intensity signals and dividing by an un-weighted sum, where the weight values (Wa, Wb) reflect the lateral position of the respective sensor strips. For the hood strips 22a, 22b, for example, this may be algebraically expressed as:

Center of Hood Contact=$[(Ha*Wa)+(Hb*Wb)]/(Ha+Hb)$

The distribution of contact is determined by calculating the contribution of each strip segment to the sum of all segments. For example the contribution of hood strip 22a may be calculated as the ratio Ha/(Ha+Hb), and the contribution of hood strip 22b may be calculated as the ratio Hb/(Ha+Hb). The SDM, in turn, utilizes the bumper and hood calculations to determine not only the location and distribution of the initial contact, but also a collision vector based on change in the center of collision as between the bumper and hood panel sensor strips 20, 22.

In summary, the impact detection apparatus of the present invention provides an easily mechanized expedient for quickly and reliably characterizing frontal vehicle collisions with longitudinally and vertically displaced piezoelectric strips and a microprocessor-based control unit for processing crash intensity signals produced by the strips. While described in reference to the illustrated embodiments, it is expected that various modifications in addition to those mentioned above will occur to those skilled in the art. For example, a different number of sensor segments may be utilized, the signal processing may be carried out by the SDM 18, and so on. Accordingly, it will be understood that systems incorporating these and other modifications may fall within the scope of this invention, which is defined by the appended claims.

What is claimed is:

1. Crash sensing apparatus for a vehicle comprising:

first and second piezoelectric strips affixed to the vehicle for producing first and second crash intensity signals in relation to mechanical energy applied to said strips upon initiation of a vehicle crash event, such first and second strips extending laterally across a frontal portion of the vehicle, with both longitudinal and vertical separation between said first and second strips; and a signal processor for receiving the first and second crash intensity signals and characterizing the crash by comparing the first and second crash intensity signals to first and second thresholds, and calculating a crush rate of the vehicle based on an elapsed time between the first crash intensity signal reaching the first threshold, and the second crash intensity signal reaching the second threshold.

2. Crash sensing apparatus for a vehicle comprising:

first and second piezoelectric strips affixed to the vehicle for producing first and second crash intensity signals in relation to mechanical energy applied to said strips upon initiation of a vehicle crash event, the first strip being affixed to a leading edge of a front bumper of the vehicle, and the second strip being affixed to a hood panel above and rearward of the first piezoelectric strip; and a signal processor for receiving the first and second crash intensity signals, comparing the first and second crash intensity signals to first and second thresholds, and characterizing the crash event as an over-ride event if the first crash intensity signal fails to reach the first threshold within a predefined time period after the second crash intensity signal reaches the second threshold.

3. Crash sensing apparatus for a vehicle comprising:

first and second piezoelectric strips affixed to the vehicle for producing first and second crash intensity signals in relation to mechanical energy applied to said strips upon initiation of a vehicle crash event, the first strip being affixed to a leading edge of a front bumper of the vehicle, and the second strip being affixed to a hood panel above and rearward of the first piezoelectric strip; and a signal processor for receiving the first and second crash intensity signals, comparing the first and second crash intensity signals to first and second thresholds, and characterizing the crash event as an under-ride event if the second crash intensity signal fails to reach the second threshold within a predefined time period after the first crash intensity signal reaches the first threshold.

4. Crash sensing apparatus for a vehicle comprising:

first and second piezoelectric strips extending laterally across a frontal portion of the vehicle for producing first and second crash intensity signals in relation to mechanical energy applied to said strips upon initiation of a vehicle crash event, at least one of the first and second piezoelectric strips being defined by a plurality of linearly aligned piezoelectric segments that produce individual crash intensity signals, and a signal processor for receiving the first and second crash intensity signals, and characterizing the crash event by computing a center of contact signal based on such individual crash intensity signals.

5. Crash sensing apparatus for a vehicle comprising:

first and second piezoelectric strips extending laterally across a frontal portion of the vehicle for producing first and second crash intensity signals in relation to mechanical energy applied to said strips upon initiation of a vehicle crash event, at least one of the first and second piezoelectric strips being defined by a plurality of linearly aligned piezoelectric segments that produce individual crash intensity signals, and a signal processor for receiving the first and second crash intensity signals, and characterizing the crash event by computing a sum of the individual crash intensity signals and a plurality of contact distribution signals corresponding to a contribution of each of the individual crash intensity signals to such sum.

6. Crash sensing apparatus for a vehicle comprising:

first and second longitudinally displaced piezoelectric strips extending laterally across a frontal portion of the vehicle for producing first and second crash intensity signals in relation to mechanical energy applied to said strips upon initiation of a vehicle crash event, such first and second strips, said first and second piezoelectric strips each being defined by a plurality of linearly aligned piezoelectric segments that produce individual crash intensity signals, and a signal processor for receiving the first and second crash intensity signals, and characterizing the crash event by computing a center of contact signal for both the first and second piezoelectric strips based on respective individual crash intensity signals, and determining a collision vector of the crash event based on the computed centers of contact.

7. A vehicle occupant restraint system having occupant restraints and a controller for deploying one or more of the restraints based on input signals indicative of intensity of a crash event, the improvement wherein:

first and second input signals are developed by first and second piezoelectric strips extending laterally across a frontal portion of the vehicle, with both longitudinal and vertical separation between said first and second strips; and a signal processor characterizes the crash event based on the first and second input signals as part of a decision making process used to trigger deployment of said occupant restraints by comparing the first and second input signals to first and second thresholds, and calculating a crush rate of the vehicle based on an elapsed time between the first input signal reaching the first threshold, and the second input signal reaching the second threshold.

8. A vehicle occupant restraint system having occupant restraints and a controller for deploying one or more of the restraints based on input signals indicative of intensity of a crash event, the improvement wherein:

first and second input signals are developed by first and second piezoelectric strips, the first strip being affixed to a leading edge of a front bumper of the vehicle, and the second strip being affixed to a hood panel above and rearward of the first piezoelectric strip; and a signal processor characterizes the crash event based on the first and second input signals as part of a decision making process used to trigger deployment of said occupant restraints by comparing the first and second input signals to first and second thresholds, and characterizing the crash event as an over-ride event if the first input signal fails to reach the first threshold within a predefined time period after the second input signal reaches the second threshold.

9. A vehicle occupant restraint system having occupant restraints and a controller for deploying one or more of the restraints based on input signals indicative of intensity of a crash event, the improvement wherein:

first and second input signals are developed by first and second piezoelectric strips, the first strip being affixed to a leading edge of a front bumper of the vehicle, and the second strip being affixed to a hood panel above and rearward of the first piezoelectric strip; and a signal processor characterizes the crash event based on the first and second input signals as part of a decision making process used to trigger deployment of said occupant restraints by comparing the first and second input signals to first and second thresholds, and characterizing the crash event as an under-ride event if the second input signal fails to reach the second threshold within a predefined time period after the first input signal reaches the first threshold.

10. A vehicle occupant restraint system having occupant restraints and a controller for deploying one or more of the restraints based on input signals indicative of intensity of a crash event, the improvement wherein:

first and second input signals are developed by first and second piezoelectric strips extending laterally across a frontal portion of the vehicle, at least one of the first and second piezoelectric strips being defined by a plurality of linearly aligned piezoelectric segments that produce individual input signals, and a signal processor characterizes the crash event based on the first and second input signals as part of a decision making process used to trigger deployment of said occupant restraints by computing a center of contact signal based on such individual input signals.

11. A vehicle occupant restraint system having occupant restraints and a controller for deploying one or more of the restraints based on input signals indicative of intensity of a crash event, the improvement wherein:

first and second input signals are developed by first and second piezoelectric strips extending laterally across a frontal portion of the vehicle, at least one of the first and second piezoelectric strips being defined by a plurality of linearly aligned piezoelectric segments that produce individual input signals, and a signal processor characterizes the crash event based on the first and second input signals as part of a decision making process used to trigger deployment of said occupant restraints by computing a sum of the individual input signals and a plurality of contact distribution signals corresponding to a contribution of each of the individual input signals to such sum.

12. A vehicle occupant restraint system having occupant restraints and a controller for deploying one or more of the restraints based on input signals indicative of intensity of a crash event, the improvement wherein:

first and second input signals are developed by first and second longitudinally displaced piezoelectric strips extending laterally across a frontal portion of the vehicle, said first and second piezoelectric strips each being defined by a plurality of linearly aligned piezoelectric segments that produce individual input signals, and a signal processor characterizes the crash event based on the first and second input signals as part of a decision making process used to trigger deployment of said occupant restraints by computing a center of contact signal for both the first and second piezoelectric strips based on respective individual input signals, and determining a collision vector of the crash event based on the computed centers of contact.

* * * * *